(12) United States Patent
Martinez

(10) Patent No.: US 7,509,592 B1
(45) Date of Patent: Mar. 24, 2009

(54) SPOTLIGHT CURSOR

(75) Inventor: Anthony Edward Martinez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1543 days.

(21) Appl. No.: 09/657,116

(22) Filed: Sep. 7, 2000

(51) Int. Cl.
*G06F 3/048* (2006.01)

(52) U.S. Cl. ...................................... 715/862

(58) Field of Classification Search ................. 345/856, 345/857, 858, 859, 860, 861, 862, 711; 715/856, 715/857, 859, 860, 861, 862
See application file for complete search history.

(56) References Cited

U.S. PATENT DOCUMENTS

| | | | |
|---|---|---|---|
| 5,488,685 A | 1/1996 | Palmer et al. | 395/197 |
| 5,526,478 A | 6/1996 | Russell, Jr. et al. | 395/154 |
| 5,748,927 A | 5/1998 | Stein et al. | |
| 5,861,885 A * | 1/1999 | Strasnick et al. | 345/850 |
| 5,995,101 A * | 11/1999 | Clark et al. | 345/711 |
| 6,018,345 A | 1/2000 | Berstis | 345/357 |
| 6,046,722 A * | 4/2000 | McKiel, Jr. | 345/862 |
| 6,075,531 A * | 6/2000 | DeStefano | 345/788 |
| 6,091,395 A * | 7/2000 | DeStefano | 345/862 |
| 6,392,671 B1 * | 5/2002 | Glaser | 345/765 |
| 6,559,872 B1 * | 5/2003 | Lehikoimen et al. | 345/856 |

FOREIGN PATENT DOCUMENTS

| | | |
|---|---|---|
| JP | 63-256987 | 10/1988 |
| JP | 06-004607 | 1/1994 |
| JP | 8115194 | 5/1996 |
| JP | 10-105357 | 4/1998 |
| JP | 10-255067 | 9/1998 |
| JP | 11-110098 | 4/1999 |
| JP | 11-306375 | 11/1999 |
| JP | 2000-222086 | 8/2000 |

\* cited by examiner

*Primary Examiner*—Thanh T Vu
(74) *Attorney, Agent, or Firm*—Yee & Associates, P.C.; David A. Mims, Jr.

(57) ABSTRACT

An apparatus and method is disclosed for displaying a secondary layer of information in a graphical user interface where the second layer of information is revealed when a point on the circumference defined by radius "r" originating at the x,y coordinates of the cursor covers a point in a secondary content of the second layer. The circumference may be set to trigger appearance of secondary content gradually, all at once or to trigger the appearance of all secondary content in a predefined zone.

1 Claim, 6 Drawing Sheets

SPOTLIGHT CURSOR

FIELD OF THE INVENTION

The present invention relates to an apparatus and method for eliminating clutter in a graphical user interface by revealing secondary content in response to movement of the cursor.

BACKGROUND OF THE INVENTION

In complex graphical user interface design, a challenge exists to strike a proper balance between functionality and screen clutter that impedes ease of use. Controls and annotation essential for the user to accomplish a task are primary content. Graphical User Interfaces (GUI's) often contain controls and annotations not critical for task completion. These controls and annotations are typically designed to supplement and explain the operation of the interface. Such controls and annotations are designated as secondary content. Examples of secondary content are items for context help popups, textual explanations and other non-critical functions. Although intended to enhance ease of use, secondary content often clutters the screen creating more visual "noise" that must be read and prioritized by the user in order for the user to progress through the task.

A need exists for a way to make secondary content "invisible" and to reveal the secondary content only when it might be needed and where the user is placed in control of the breadth of the exposure of the secondary content. Therefore a further need exists for a way to reveal items of secondary content based on actions taken by the user such as movement of the cursor.

U.S. Pat. No. 6,018,345 discloses movement and presentation of the cursor used to indicate the presence of links and means of traversing the links. The cursor is presented in a first manner while the cursor is over non-link elements in the first page. As the cursor is moved over the links, the cursor is presented in a second manner indicating to the user how to traverse to the second page. U.S. Pat. No. 5,526,478 discloses a computer implemented method of annotating a geometric figure displayed and manipulable in three-dimensional representation on a display of a computer system with a pointer. The pointer is also displayed and manipulable in three dimensional representation on the display. The particular view orientation of the geometric figure with the pointer can be preserved such that the particular view orientation of the geometric figure with the pointer can later be retrieved. When the pointer is activated, the pointer can be associated with a multimedia function such that when the pointer is again activated, the multi-media function is executed. U.S. Pat. No. 5,488,685 discloses an object oriented graphic user interface (GUI) having overlapping windows and an access window having topics, index and "look for" button functions for selection by a user. Selection of one of the button functions results in the generation and display of entries in a predefined area of the access window. Visual cues in the form of coach marks are generated for identifying features on the display. The coach marks encircle, point to, and/or underline objects, features, icons, folders and other display elements to assist the user in operating the computer.

What is needed beyond the prior art is a simple and effective way to cause secondary content to be revealed based on user actions.

SUMMARY OF THE INVENTION

The invention which meets the needs identified above is an apparatus and method for displaying a secondary layer of information in a graphical user interface where the second layer of information is revealed when a point on the circumference defined by radius "r" originating at the x,y coordinates of the cursor covers a point in a secondary content of the second layer. The circumference may be set to trigger appearance of secondary content gradually, all at once or to trigger the appearance of all secondary content in a predefined zone.

DETAILED DESCRIPTION OF THE PREFERRED EMBODIMENT

Figure 1:
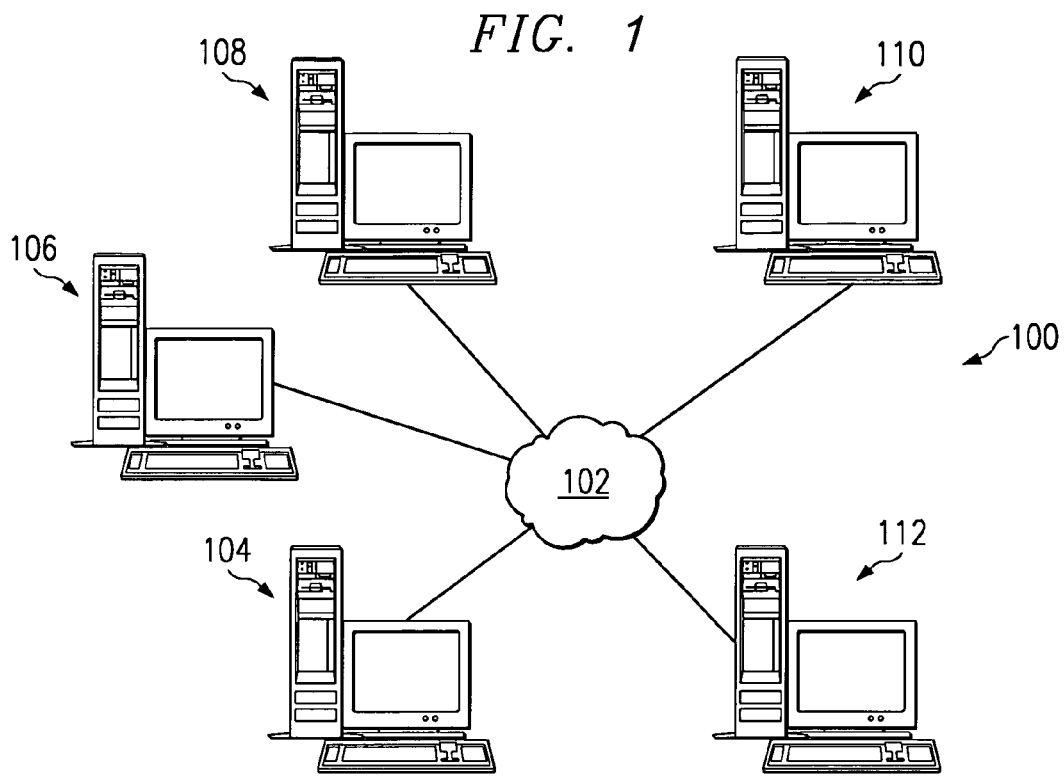
FIG. 1 depicts a distributed data processing system in which the invention may be implemented.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections, personal computers, or network computers. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Computers 104, 106, 108, 110, and 112 are all connected to network 102. Distributed data processing system 100 may also be implemented as a number of different types of networks, such as for example, an intranet, a local area network (LAN), or a wide area network (WAN).

Figure 2:
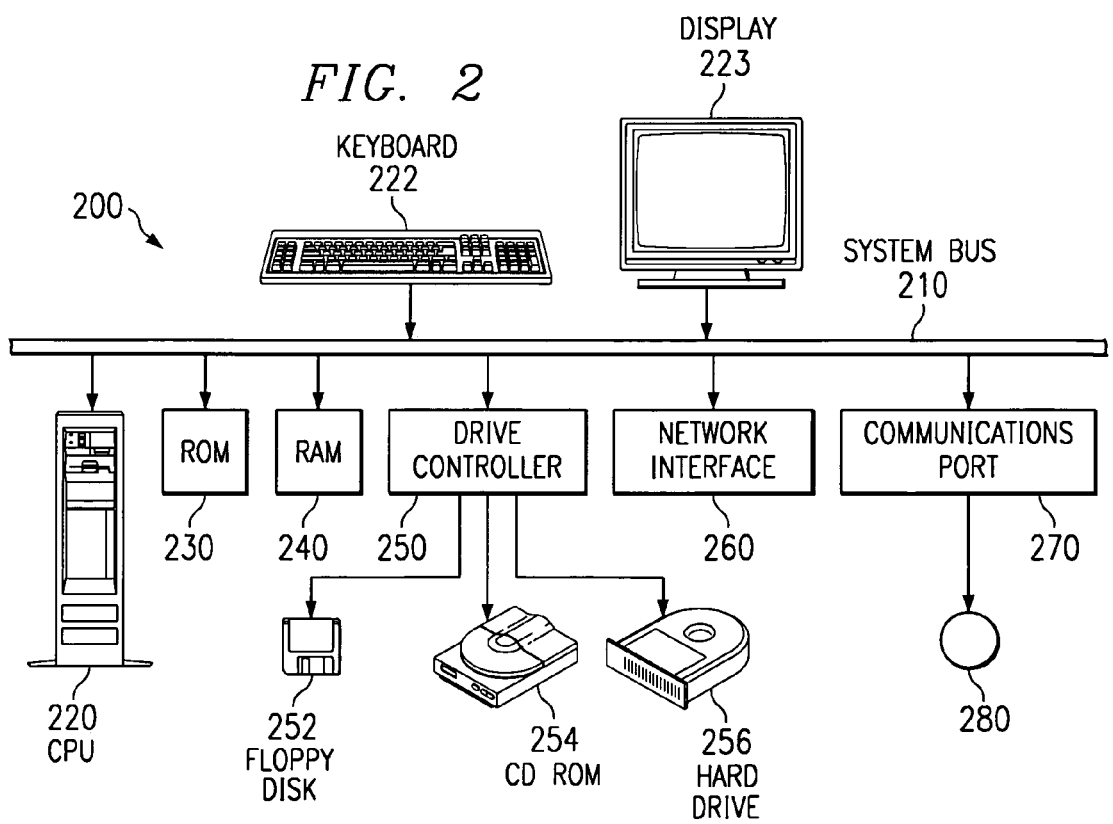
FIG. 2 depicts a computer in which the software to implement the invention may be stored.

FIG. 2 depicts computer 200. Although the depicted embodiment involves a personal computer, a preferred embodiment of the present invention may be implemented in other types of data processing systems. An exemplary hardware arrangement for computer 200 follows. Keyboard 222 and display 223 are connected to system bus 210. Read only memory (ROM) 230 contains, typically, boot strap routines and a Basic Input/Output System (BIOS) utilized to initialize Central Processing Unit (CPU) 220 at start up. Random Access Memory (RAM) 240 represents the main memory utilized for processing data. Drive controller 250 interfaces one or more disk type drives such as floppy disk drive 252, CD ROM 254 and hard disk drive 256. The number and type of drives utilized with a particular system will vary depending upon user requirements. A network interface 260 permits communications to be sent to and received from a network. Communications port 270 may be utilized for a dial up connection to one or more networks 280 while network interface 260 is a dedicated interface to a particular network. Programs for controlling the apparatus shown in FIG. 2 are typically stored on a disk drive and then loaded into RAM for execution during the start-up of the computer.

Figure 3:
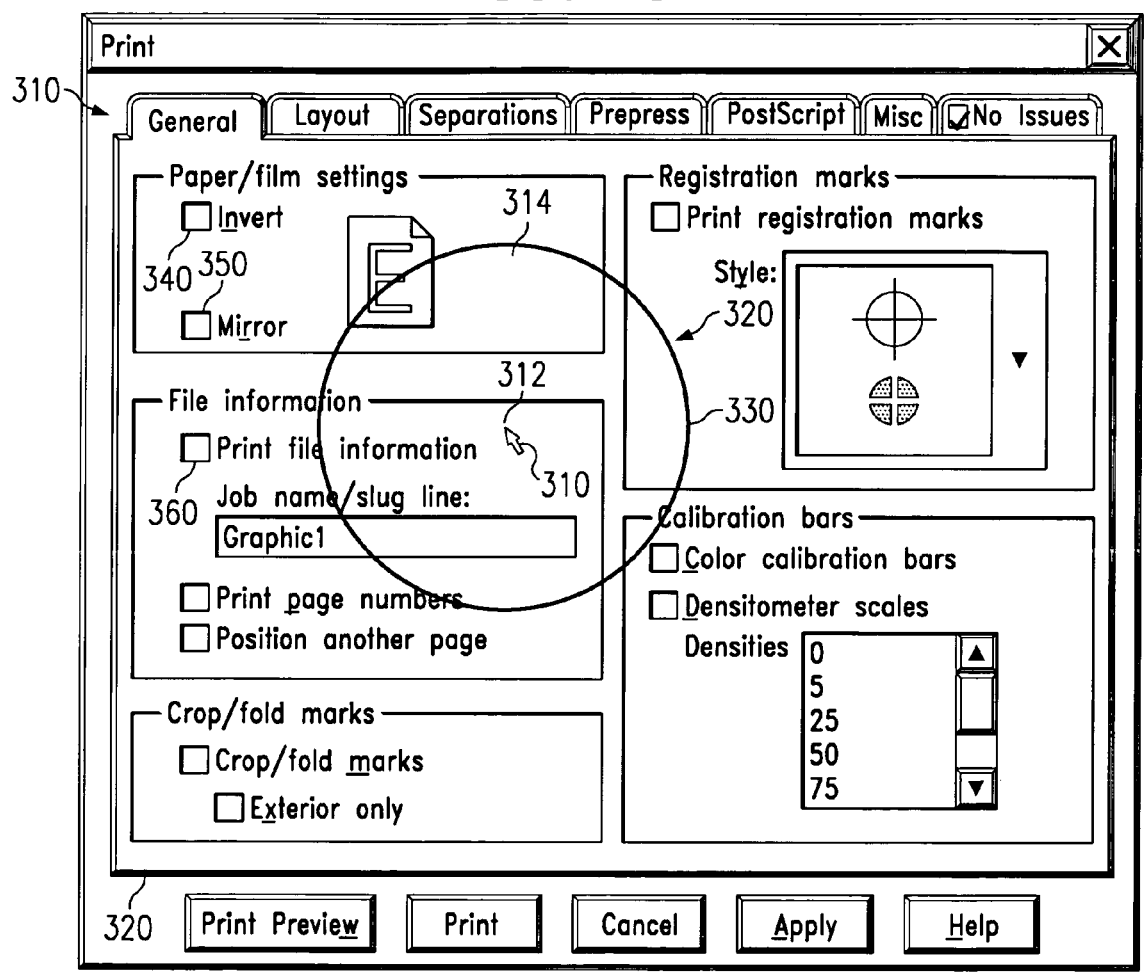
FIG. 3 depicts the spotlight cursor without displayed secondary content.

FIG. 3 depicts the appearance of spotlight cursor 320. Spotlight cursor 320 has light 314, cursor 311 and "c" 330. Cursor 311 has tip 312. When referring to the coordinates of the cursor, the coordinates are those of tip 312. The tip is defined as the most forward point of the arrow displayed as the cursor. Persons skilled in the art are aware that any other point on the cursor could be chosen. Tip 312 defines the center of light 314. Light 314 is an area defined by a circle with circumference "c" 330. Light 314 has radius "r" (not shown) which is the straight line distance from tip 312 to "c" 330. Circumference Ac@ may appear as a sharp line in contrast to screen 310, a broken line in contrast to screen 310, a soft line in contrast to screen 310 or a fuzzy line blending with screen 310; however, no matter what appearance is given to the circumference, "c" will be defined mathematically in relation to radius "r" for the purpose of spotlight cursor 320. As shown in FIG. 3, spotlight cursor 320 has not caused any secondary content to appear on screen 310. Screen 310 has "Invert" checkbox 340, "Mirror" checkbox 350 and "Print File Information" checkbox 360.

Figure 4:
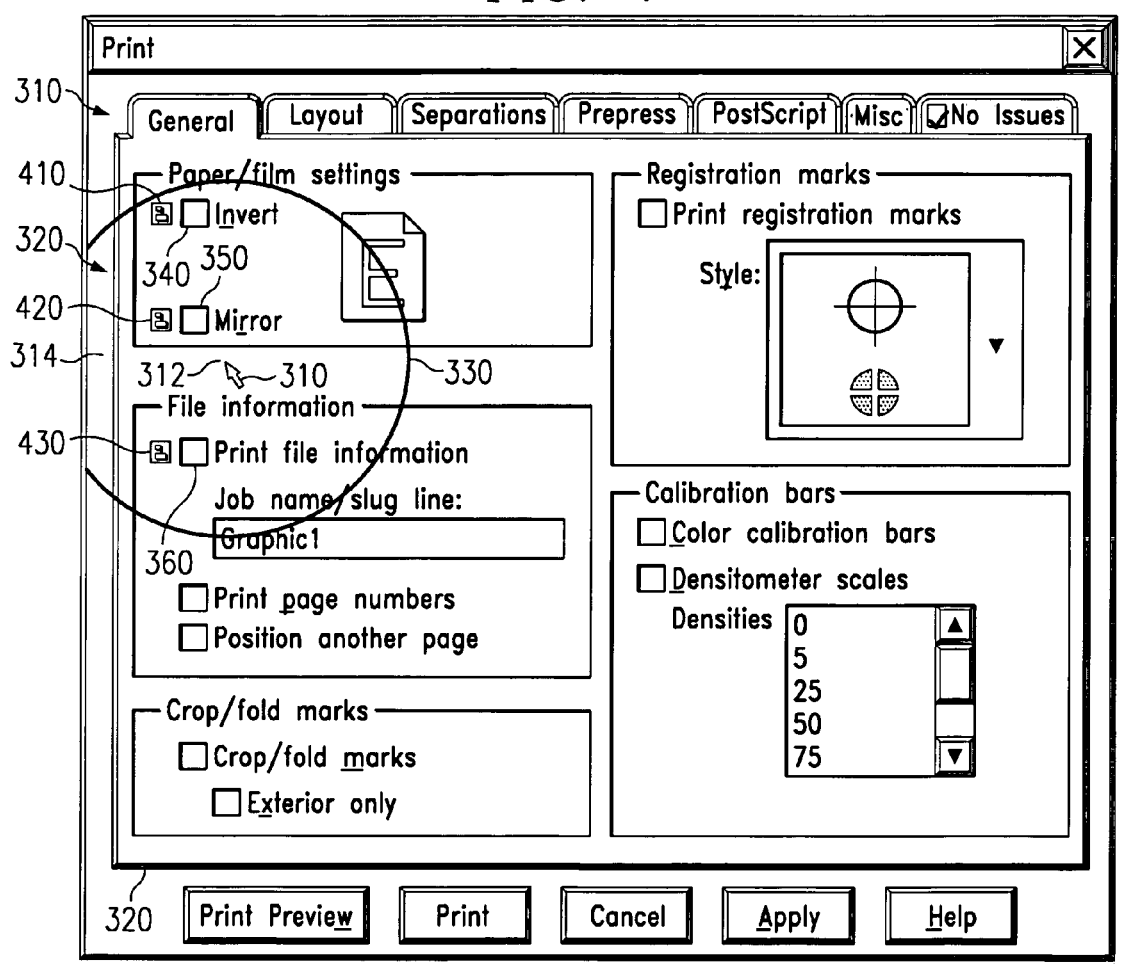
FIG. 4 depicts the spotlight cursor with displayed secondary content.

FIG. 4 depicts screen 310 with spotlight cursor 320 in a new position. The user has moved cursor 311 to the new position. As cursor 311 moved, light 314, with "c" 330 and center coinciding with tip 312 of cursor 311, also moved. Secondary content information icons have appeared. Specifically "Invert" checkbox information icon 410 has appeared adjacent to "Invert" checkbox 340, "Mirror" checkbox information icon 420 has appeared adjacent to "Mirror" checkbox 350, and "Print file information" checkbox information icon 430 has appeared adjacent to "Print file information" checkbox 360. As will be explained in further detail below the appearance of "Invert" checkbox information icon 410, "Mirror" checkbox information icon 420 and "Print file information" checkbox information icon 430 were caused by covering with "c" of spotlight cursor 320.

As used herein, "cover" means the act of a point on a secondary content being contacted by a point on "c" (where "c" is the circumference of a circle with radius "r") or being contained within the boundary of "c" or the coordinates of a point on "c" coinciding or equaling coordinates of a point on a secondary control, or a point on the boundary of a predefined zone containing one or more secondary contents. As used herein, secondary content means text, icons, images or controls. The introduction of secondary content in a GUI is done by the application programmer, taking advantage of the capability and availability of the spotlight cursor.

Figure 5:
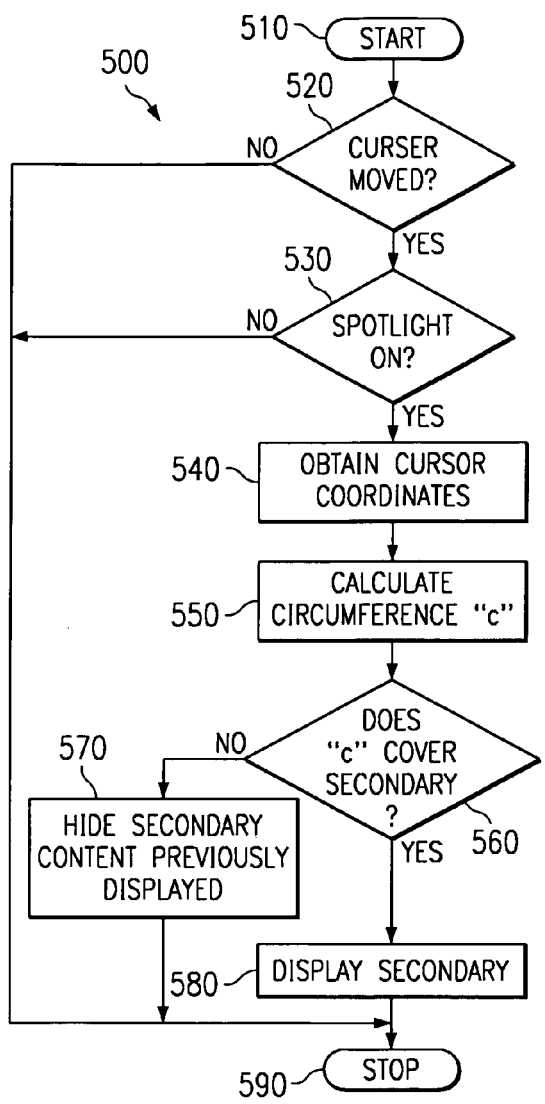
FIG. 5 depicts a flow chart for a first program controlling the spotlight cursor.

The method for using the spotlight cursor is as follows. The program obtains the x,y coordinates of the cursor. Next, the program applies the pre-selected radius to define a circle of circumference "c" with origin at x,y (tip 312 of FIG. 3) and radius "r". Next the program determines whether or not there are any secondary contents that are within the circumference of the circle. If there is a secondary content within circumference "c" then the secondary content will be activated and revealed in the primary layer of the GUI. If there are no secondary contents within the circumference "c" of the circle, then the program does nothing. The program cycles each time the cursor moves (each time the cursor coordinates change). The program may be incorporated into an operating system, an application, or the program may be a plug-in for adaptation to a pre-existing program. Once the spotlight feature is active, no further action is needed on the user=s part FIG. 5 depicts the flow chart of program 500 for using spotlight cursor 320. Cursor movement activates program 500. First, program 500 starts (510) and determines whether or not the cursor has moved (520). If the cursor has not moved, program 500 goes to step 590. If the cursor has moved, program 500 determines whether or not the spotlight cursor is on (530). If the spotlight cursor is not turned on, program 500 will proceed to step 590. If the spotlight cursor is turned on, program 500 will proceed to obtain the coordinates of the cursor (540). Next, program 500 will use the cursor coordinates and "r" to calculate the location of "c", where "c" is the circumference of a circle of radius "r" (550). The value of "r" will be set by a configuration program, a default value, or a setting selected by the programmer of the application. Next, program 500 will determine whether or not "c" has covered secondary content (560). If "c" has not covered a secondary content, program 500 hides secondary content that has been previously displayed (570) and goes to step 590. If "c" has covered a secondary content, the secondary content will be displayed (580). The secondary content will be displayed according to a method of appearance chosen in a configuration program. Program 500 then stops (590).

Figure 6:
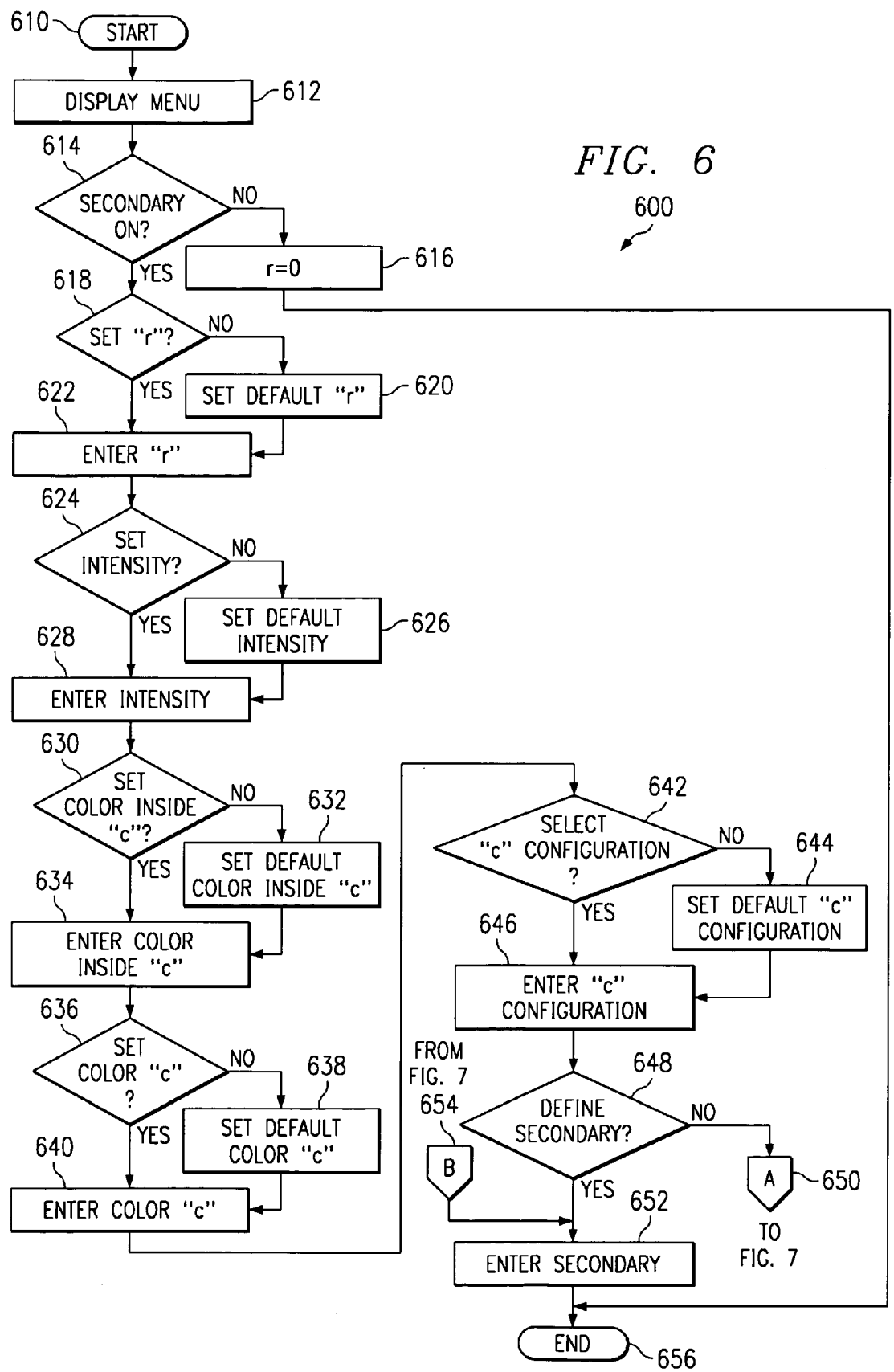
FIG. 6 depicts a flow chart for a second program controlling configuration of the spotlight cursor.

FIG. 6 depicts a flow chart for program 600 for configuration of the spotlight cursor. Program 600 begins (610) and displays a menu (612). First, program 600 determines whether or not the secondary content is to be displayed (614). If the user selects "no", program 600 will set "r"=0 (616) and end (656). By setting "r"=0, the spotlight cursor is rendered inoperable as there will be no "c" to cover secondary content. If secondary content is to be displayed, program 600 will determine whether or not "r" has been selected (618). If the user has not entered "r", program 600 will set "r" to a default value (620) and enter the default value for "r" (622). If the user has set "r", program 600 will enter the value of "r" (622). Program 600 will determine whether or not the user has set the intensity (624). If "r" is set to a minimum value "1", then spotlight cursor 320 may not be visible at tip 312 of cursor 311. However, spotlight cursor 320 will have a minimum "c" to effect display of secondary content. The intensity is the brightness of the circle of light within circumference "c". If the user has not set the intensity, program 600 will select the default intensity (626) and program 600 will go to step 628 and enter the value for the intensity (628). If the user sets the intensity, program 600 will go to step 628 and enter the value for the intensity (628). Next, program 600 will determine whether or not a color has been selected for the area inside "c" (630). If the user does not select a color for the area inside "c", program 600 will set the color to the default color (632) and program 600 will go to step 634 and enter the color (634). If the user selects a color for the area inside "c", program 600 will go to step 634 and enter the color (634). Next, program 600 will determine whether a color has been selected for "c" (636). If a color has not been selected for "c", program 600 will select the default color for "c" (638) and program 600 will go to step 640 and enter the color (640). If the user selects a color for "c" program 600 will go to step 640 and enter the color (640). Next, program 600 will determine whether the configuration of "c" has been selected (642). If the user has not selected a configuration for "c", program 600 will set the configuration of "c" to the default configuration (644) and program 600 will proceed to step 646 and enter the configuration (646). If the user has selected a configuration for "c", then program 600 will enter the configuration for "c" (646). Next, program 600 will determine the mode of appearance of secondary controls (648). If the user selected a mode of appearance for secondary controls, program 600 will enter the mode of appearance of secondary controls (652). If the user has not selected a mode of appearance for secondary controls, then program 600 will go to program 700 shown on FIG. 7 via connection 650.

Figure 7:
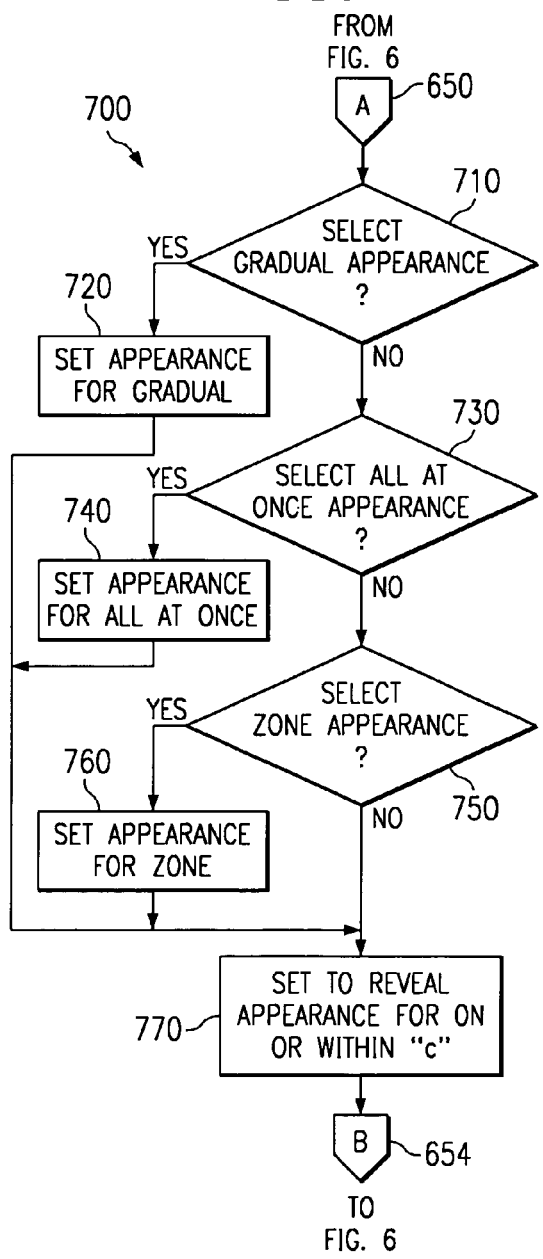
FIG. 7 depicts a continuation of the flow chart in FIG. 6.

Referring to FIG. 7, program 700 continues from program 600 via connection 650 and will determine whether or not "gradual appearance" has been selected (710). If "gradual appearance" has been selected, program 700 will set the appearance of secondary content for "gradual appearance" (720) and go to step 770 which will set the display to reveal appearance when covered by "c" (770). If the user has not selected "gradual" then program 700 will determine whether or not the user has selected "all at once" (730). If the user has selected "all at once" then program 700 will set appearance for "all at once" (740) and program 700 will go to step 770 which will set the computer to reveal secondary content when covered by "c" (770). Next, program 700 will determine, whether or not the user has selected "zone" (750). If the user has selected "zone", then program 700 will set the appearance for the zone (760) and proceed to step 770. If the user has not selected "zone", then program 700 will go to step 770 which will cause the computer to reveal secondary content when covered by "c". Then program 700 will return to program 600 via connector 654. Referring again to FIG. 6, program 600 will then enter the secondary definition (652), and end (656).

Figure 8:
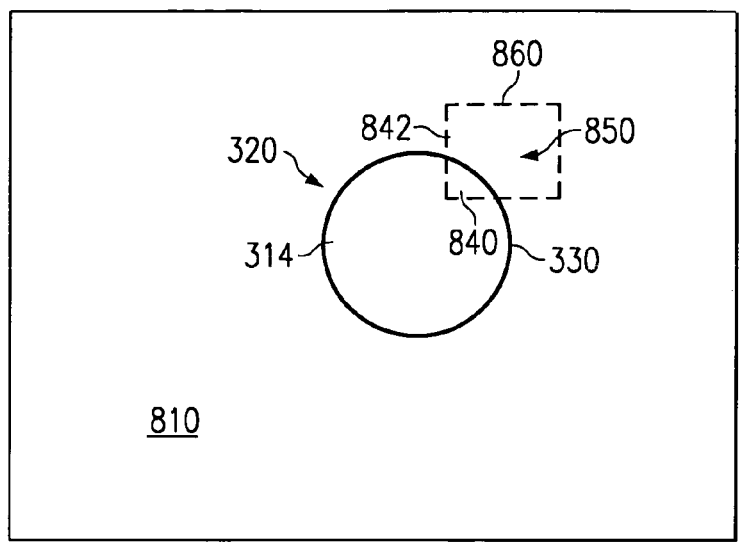
FIG. 8 depicts an example of gradual display.

FIG. 8 depicts circumference "c" gradually revealing a secondary content item. Spotlight cursor 320 has circumference 330 and light 314. Secondary content item 850 has outer edge 860. When circumference 330 covers a point on outer edge 860, secondary content item 850 will start to be displayed. In FIG. 8, circumference 330 has passed over outer edge 860 and intersecting area 840 is revealed while remainder area 842 is not displayed. As circumference 330 advances and covers additional points of secondary item 850 intersecting area 840 will grow and remainder area 842 will decrease.

Figure 9:
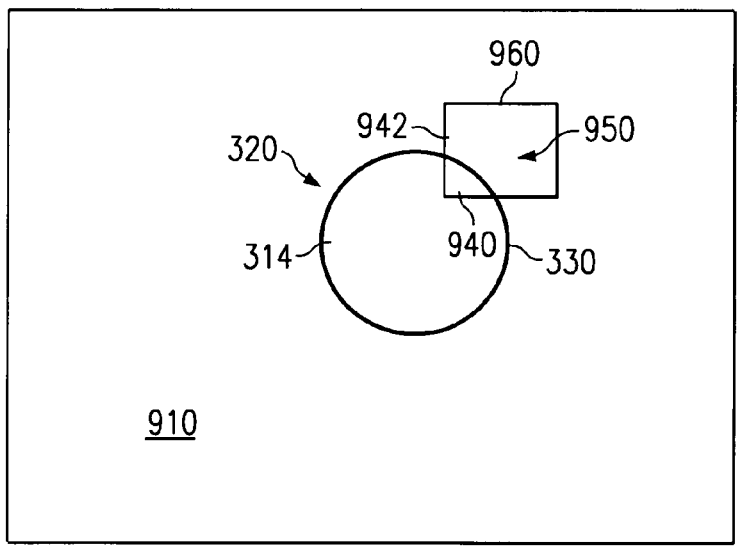
FIG. 9 depicts an example of all display.

FIG. 9 depicts circumference "c" revealing secondary content item 950 all at once. Spotlight cursor 320 has circumference 330 and light 314. Secondary content item 950 has outer edge 960. When circumference 330 covers a point on outer edge 960, secondary content item 950 will be fully displayed. There will be no intersecting area or remainder area. No matter what point on outer edge 960 of secondary content item 950 is covered by circumference 330, all of secondary content item 950 will be displayed.

Figure 10:
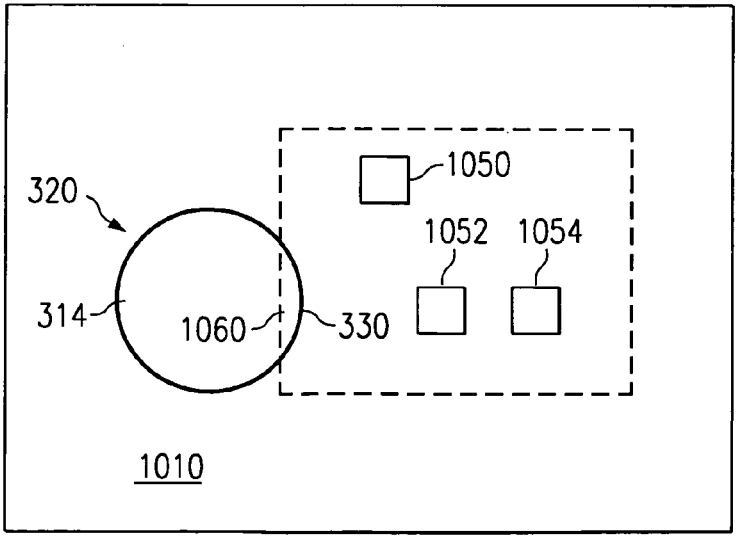
FIG. 10 depicts and example of zone display.

FIG. 10 depicts circumference "c" revealing a group of secondary content by covering a point in the predetermined zone. Spotlight cursor 320 has circumference 330 and light 314. Secondary content items 1050, 1052 and 1054 are positioned within pre-defined zone boundary 1060. When circumference 330 covers a point on zone boundary 1060, all three secondary content items 1050, 1052 and 1054 will appear fully displayed at the same time.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A computer implemented method for using a circle of light to cause a text, an image, an icon or a control to appear on a computer screen comprising:

creating the text, the image, the icon, or the control in a computer screen so that, when a user chooses to hide the text, the image, the icon, or the control, the text, the image, the icon, or the control will only appear in the computer screen when a first set of coordinates in the circle of light coincides with a second set of coordinates in the text, the image, the icon, or the control;

using a cursor operable in the computer screen, the cursor having a tip, establishing the circle of light to have a center at the tip, a configurable radius, a configurable color, and a configurable intensity so that the circle of light will move with the cursor and the center will always be at the tip;

moving the cursor on the screen until the circle of light causes the text, the image, the icon, or the control to appear; and when the user chooses not to hide the text, the image, the icon, or the control, automatically setting the configurable radius to zero.

* * * * *